M. STEPHENS.

Improvement in Devices for Lining Cement Pipes.

No. 5,494.

Reissued July 15, 1873.

Witnesses

Chas. Smith

Geo. F. McKenney

Inventor

Melvin Stephens

Lemuel W. Serrell

Atty

UNITED STATES PATENT OFFICE.

MELVIN STEPHENS, OF BROOKLYN, NEW YORK.

IMPROVEMENT IN DEVICES FOR LINING CEMENT PIPES.

Specification forming part of Letters Patent No. 126,100, dated April 23, 1872; reissue No. 5,494, dated July 15, 1873; application filed June 5, 1873.

*To all whom it may concern:*

Be it known that I, MELVIN STEPHENS, of Brooklyn, in the county of Kings and State of New York, have invented an Improvement in Lining Cement Pipes, of which the following is a specification:

Cement water-pipes have been made of sheet-iron lined with hydraulic cement, but in applying the lining considerable difficulty has been experienced in consequence of the plastic cement settling down before it has become consolidated or set; hence the lining has to be rendered uniform by cutting the surplus off at the lower end and adding cement to the upper end; and this operation has to be done by hand and adds to the cost, besides which the pipe is not perfect. In many instances the cement does not adhere to the iron and falls down in mass. This is particularly the case with large-sized pipes. The usual way of making the cement pipe is to spread the plastic cement upon the inside of sheet-metal pipe by means of a conical form that is drawn through the metal pipe. A core that is sometimes slightly conical has been employed to sustain the cement while being introduced and tamped, and when the cement is partially set the core is rotated, shaken, and worked sufficient to loosen it, and then it is withdrawn. I make use of a contractible cylinder that is introduced to sustain the plastic mass until it sets sufficiently to be self-supporting, and this cylinder is contracted to separate it from the cement previous to its being withdrawn.

Figure 1:
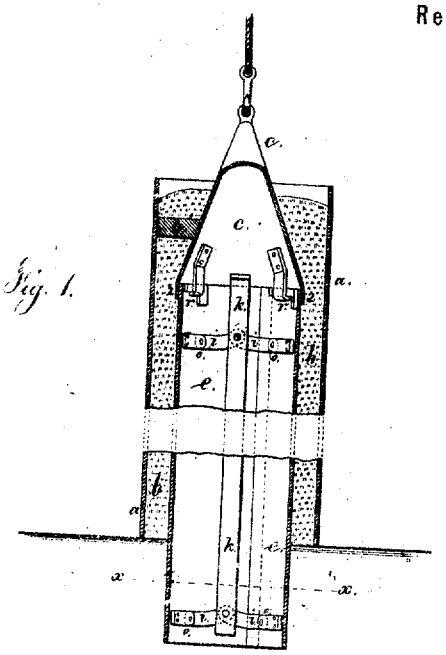
Figure 2:
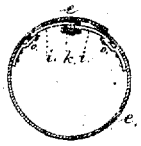

In the drawing, Figure 1 is a vertical section of the cone, cylinder, and pipe as the same is being made. Fig. 2 is a sectional plan at the line *x x* of the contractible cylinder.

The metal pipe *a* is to be lined with a layer of cement, *b*. To effect this the conical spreader *c* is drawn up through the tube *a*, and the cement resting thereon is spread upon the interior of the tube *a*. There are guide-fins *c'* to maintain uniformity in the lining that is applied to the pipe. These parts are known and are not claimed. The contractible cylinder *e* is made of metal, in one or more pieces, and the edges lap or come in contact. The cylinder is represented with toggle-joint bars *i i* that are attached at their ends *o o*, and the separate pairs of bars are connected one to the other by the longitudinal bar *k*, so that the toggles can be operated simultaneously to contract or expand the cylinder *e*. It is to be understood that two or more of these pairs of toggle-bars may be employed, according to the length of the pipe; and if the tube or cylinder *e* is made of more than one piece the toggle can be applied at each joint in such cylinder, so as to contract the cylinder *e* at more than one place in its circumference. This contractible cylinder *e* is to be inserted into the metal tube to support the cement in contact with such tube *a* while the cement is soft and plastic, and previous to and during the consolidation or setting of the cement, and to facilitate this operation the cylinder *e* should be introduced within the cylindrical flange 2 of the cone *c*, and united by the bayonet-locks *r* or other suitable device so as to be drawn into the pipe by the cone in its movement, and after the lining has been spread the cone is to be disconnected from the cylinder *e* and removed for use elsewhere, while the cylinder *e* remains to support the cement until it sets or hardens sufficiently. The cement may be pressed into the space by a ring-plunger if desired. The cylinder *e* may be expanded by the toggles at the time it is drawn into the pipe by the cone, or it may be expanded after it is in place, so as to more fully consolidate the cement, and after the cement has set or hardened sufficiently the cylinder is contracted for loosening the same from the cement to allow of its removal without injury to the pipe. The cylinder *e* might be employed in cases where the plastic cement is introduced into the space between the pipe *a* and cylinder *e*.

I do not claim a sectional core and a mold in which a cement, sewer, or drain pipe is made, as in this case the pipe is taken from the mold and the core removed before the cement sets or hardens, the object being to prevent the cement adhering to the mold.

In my improvement the contractible core is employed to insure adhesion between the sheet-iron pipe and its cement lining, and thereby make a superior pipe for strength and durability.

I claim as my invention—

1. The manufacture of cement-lined metal pipe, by means of a contractible cylindrical core that retains the cement lining firmly in contact with the pipe until the cement has consolidated, after which the core is removed, substantially as set forth.

2. The cylinder *e*, with the toggles connected to the inside thereof, for expanding and sustaining the cylinder, and for contracting the same previous to removal, substantially as set forth.

3. The contractible cylinder *e*, connected removably to the conical spreader, substantially as and for the purposes set forth.

Signed by me this 3d day of June, 1873.

MELVIN STEPHENS.

Witnesses:

GEO. T. PINCKNEY,

CHAS. H. SMITH.